(12) United States Patent
Ducournau et al.

(10) Patent No.: US 11,312,469 B2
(45) Date of Patent: Apr. 26, 2022

(54) LINTEL STRUCTURE FOR AIRCRAFT FUSELAGE AND FUSELAGE COMPRISING SUCH A LINTEL

(71) Applicant: STELIA AEROSPACE, Rochefort (FR)

(72) Inventors: Hervé Ducournau, Rochefort (FR); Alain Prudent, Montbrun Lauragais (FR); Florian Gauchet, Rochefort (FR)

(73) Assignee: STELIA AEROSPACE

( * ) Notice: Subject to any disclaimer, the term of this patent is extended or adjusted under 35 U.S.C. 154(b) by 1470 days.

(21) Appl. No.: 15/327,118

(22) PCT Filed: Jul. 17, 2015

(86) PCT No.: PCT/EP2015/066485
§ 371 (c)(1),
(2) Date: Jun. 2, 2017

(87) PCT Pub. No.: WO2016/009075
PCT Pub. Date: Jan. 21, 2016

(65) Prior Publication Data
US 2018/0009521 A1   Jan. 11, 2018

(30) Foreign Application Priority Data

Jul. 18, 2014 (FR) ...................................... 1456975

(51) Int. Cl.
*B64C 1/06* (2006.01)
*B64C 1/14* (2006.01)
*B64C 1/08* (2006.01)

(52) U.S. Cl.
CPC ............... *B64C 1/068* (2013.01); *B64C 1/08* (2013.01); *B64C 1/1461* (2013.01); *B64C 1/1492* (2013.01)

(58) Field of Classification Search
CPC ......... B64C 1/08; B64C 1/068; B64C 1/1461; B64C 1/1492; B64C 1/069
See application file for complete search history.

(56) References Cited

U.S. PATENT DOCUMENTS

2003/0234322 A1* 12/2003 Bladt .................... B64C 1/1484
244/129.3
2009/0230246 A1* 9/2009 Depeige ................ B64C 1/1492
244/129.3
(Continued)

FOREIGN PATENT DOCUMENTS

| EP | 0118116 | 9/1984 |
| EP | 2106364 | 6/2012 |
| FR | 2928343 | 9/2009 |

OTHER PUBLICATIONS

Hansen, et al. "Potential benefits of integrally stiffened aircraft structures", 1st CEAS European Air and Space Conference, 2007, pp. 49-58, XP009150372.
(Continued)

*Primary Examiner* — Philip J Bonzell
*Assistant Examiner* — Tye William Abell
(74) *Attorney, Agent, or Firm* — Perman & Green, LLP

(57) ABSTRACT

An aircraft fuselage includes a structure, considered in respect of all or part of the fuselage, with fuselage upper sub-structure constituting an upper part of the fuselage and a fuselage bottom sub-structure constituting a lower part of the fuselage. Openings in the structure of the fuselage are intended for the installation of windows or doors for exiting the fuselage. Furthermore, the fuselage upper sub-structure and the fuselage bottom sub-structure form fuselage sub-structures that are assembled with one another via at least one lintel in which all or some of the openings intended for installing the exit doors or windows are formed.

11 Claims, 5 Drawing Sheets

(56) References Cited

U.S. PATENT DOCUMENTS

| | | | | |
|---|---|---|---|---|
| 2011/0017870 A1* | 1/2011 | Gallant | ................... | B64C 1/061 |
| | | | | 244/129.3 |
| 2012/0121854 A1* | 5/2012 | Yoshida | .................. | B64C 1/061 |
| | | | | 428/137 |
| 2012/0141703 A1* | 6/2012 | Goetze | .................... | B64C 1/068 |
| | | | | 428/34.1 |
| 2012/0223187 A1* | 9/2012 | Kismarton | ............ | B64C 1/1492 |
| | | | | 244/120 |

OTHER PUBLICATIONS

International Search Report, International Application No. PCT/EP2015/066485, dated Sep. 28, 2015.

\* cited by examiner

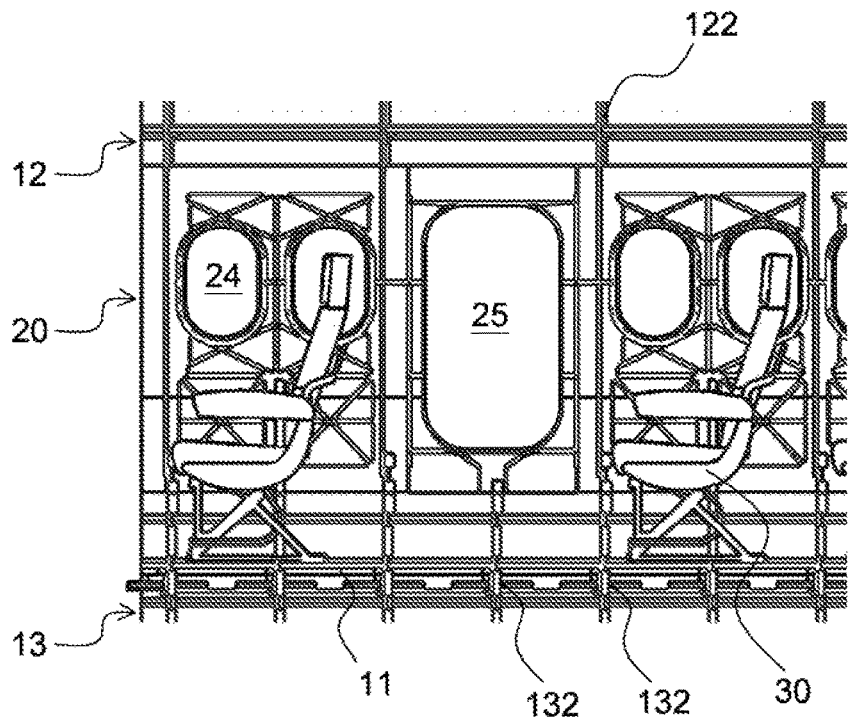
Fig.4a
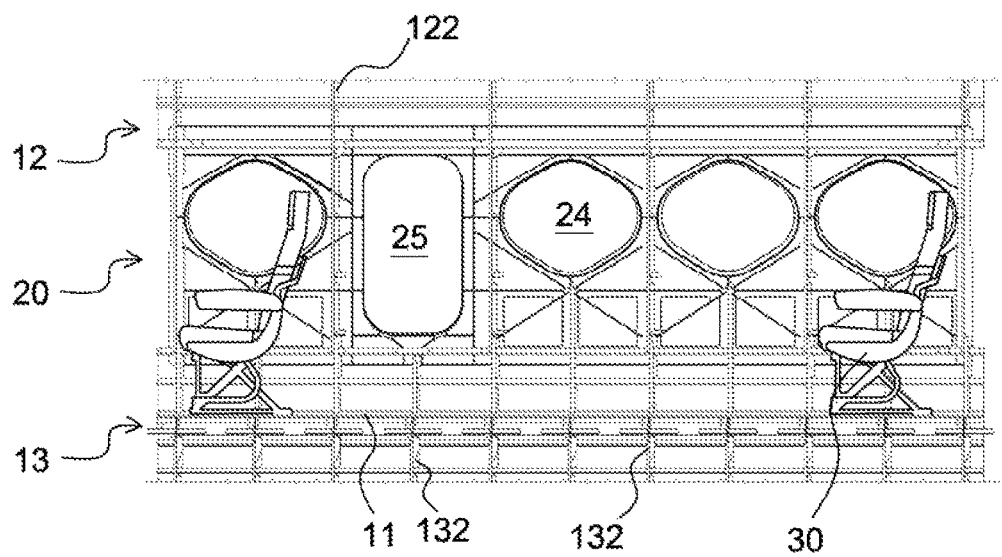
Fig.4b
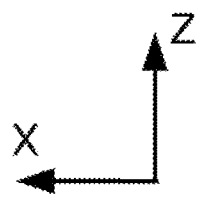

LINTEL STRUCTURE FOR AIRCRAFT FUSELAGE AND FUSELAGE COMPRISING SUCH A LINTEL

CROSS REFERENCE TO RELATED APPLICATIONS

This application is the National Stage of International Application No. PCT/EP2015/066485, having an International Filing Date of 17 Jul. 2015, which designated the United States of America, and which International Application was published under PCT Article 21(2) as WO Publication No. 2016/009075 A1, and which claims priority from, and the benefit of, French Application No. 1456975, filed on 18 Jul. 2014, the disclosures of which are incorporated herein by reference in their entireties.

BACKGROUND

1. Field

The disclosed embodiment belongs to the field of aircraft structures and more particularly to the field of aircraft fuselage structures.

More particularly, the disclosed embodiment relates to a fuselage section structure comprising openings, such as openings for the placement of windows in particular.

2. Brief Description of Related Developments

In the aircraft field, in particular in the field of aircraft for passenger transport, it is conventional to provide windows in the walls of the passenger cabin, so that the passengers can see the outside of the aircraft in which they are in during flight and in order to provide exits for emergency evacuations.

In order to be able to install the windows and emergency exits, it is necessary to provide openings in the fuselage, which constitute structural irregularities which weaken the structure, particularly because of the fatigue consecutive to cycles of pressurization and depressurization of the fuselage due to flights at altitude, and which thus lead to the provision of reinforcements around each of the window or exit openings.

While it has been considered to eliminate the windows, as a solution to remedy these disadvantages, this solution has never been applied, primarily because of the psychological aspects that it entails and the risk of claustrophobia for the passengers.

SUMMARY

Modern passenger transport airports thus all comprise fuselage windows, and the designers of aircraft have to take into account the constraints of installation of these windows.

In particular, in spite of the presence of the structural irregularity corresponding to the location of a window or of an exit, it is also necessary to ensure continuity in the flow of the forces in the structure of the fuselage.

The forces in the structure of the fuselage have different origins (bending of the fuselage, tension-compression of the fuselage, torsion of the fuselage, pressurization of the fuselage . . . ) and they are reflected in the flows of forces in the fuselage structure, which is a hull structure, that is to say an envelope of a volume which is mostly hollow.

FIG. 1 illustrates a known and widely used example of a structure of a part of the fuselage of an aircraft. In this partial view of the structure 90, an illustration is provided, in accordance with a general architecture used in numerous aircraft, of a set of frames 91 between which longitudinal stringers or stiffeners 92 are arranged and a stress-bearing fuselage cladding 95, often referred to as fuselage skin.

The frames 91 are closed structures that determine the shape of the cross section of the fuselage along a plane perpendicular to the longitudinal axis of the fuselage.

The longitudinal stiffeners 92, which are oriented substantially parallel to the longitudinal axis of the fuselage, together with the frames 91 form a lattice structure to which the fuselage cladding 95 is fixed. This arrangement makes it possible to confer to the structure an appropriate structural resistance by the selection of the materials and the dimensions of the elements, and to prevent buckling of the cladding.

As illustrated, the openings 93 for installing the desired windows are arranged between the frames 91 in zones of the fuselage cladding 95 that lack longitudinal stiffeners.

According to this aspect, the disturbances in the flow of the forces in the structure of the fuselage are limited due to the fact of the continuity of the frames 91, and it is possible to limit the reinforcements of structures, and thus the mass, to zones localized around each window, in particular, by means of window frames 94, in order to compensate for the absence of fuselage cladding and of a longitudinal stiffener at the location of the window.

However, the window frames have to be connected to the fuselage cladding, which leads to complex assembly operations with drilling, the placement of fasteners, and the placement of sealing putties.

It is also known from the patent application EP 2106364 to produce windows frames integrated in the fuselage frames. In this solution, in order to ensure continuous flow of the forces, a frame is arranged in the axis of a window at the place where the frame is divided in its plane into two parts along a Y shape. This solution, while it makes it possible to achieve good flow of the forces in the frame around the window, leads to a frame that is more complex to produce and to assemble than a conventional frame, and requires, in terms of design, the taking into account of the safety analyses, given the impact of structural fatigue induced by the window on the structure of the frame itself.

These known solutions moreover have the disadvantage of generating high constraint (obligation) between the separation distances between the windows and the spacing of the frames, a frame always having to be placed between two fuselage frames or in the axis of a frame.

Usually, the spacing of the frames is fixed, and then the spacing of the windows is imposed, even if it does not meet an optimum in terms of cabin arrangement in the fuselage.

If the spacing of the windows is fixed a priori, the spacing of the frames would be imposed, even if it does not correspond to an optimum in terms of implementation of the structure of the fuselage.

The aim of the presently disclosed embodiment is to remedy these disadvantages by proposing a fuselage structure and a lintel structure which makes it possible to separately optimize the structure of the window zones of the structure from the other fuselage zones and to uncouple the constraint between the spacing of the fuselage frames and the spacing of the windows.

For this purpose, the disclosed embodiment relates to an aircraft fuselage having a structure which, considered in respect of all or part of the fuselage, comprises fuselage upper sub-structure constituting an upper part of the fuselage, comprises a fuselage bottom sub-structure constituting a lower part of the fuselage, and comprises openings intended for the installation of windows or exit doors of the fuselage. The fuselage part can consist of a fuselage section which can be defined between fuselage frames that are at a distance from one another.

In addition, the fuselage upper sub-structure and the fuselage bottom sub-structure form sub-structures of the fuselage that are assembled to one another via at least one lintel, in which all or some of the openings intended for installing windows or exit doors are formed.

Thus, a fuselage or fuselage section is obtained, which is the result of an assembly of different parts, each of the parts corresponding to a homogenous sub-structure, which is subject to specific stresses and which can be produced optimally with minimum impact of its design by the other sub-structures.

In an aspect, the at least one lintel comprises:

a lower zone, to which the fuselage bottom sub-structure is fixed by an upper edge of the fuselage bottom sub-structure, at a lower lintel edge, and absorbing forces of the structure of the fuselage bottom sub-structure;

an upper zone, to which the fuselage upper sub-structure is fixed by a lower edge of the fuselage upper sub-structure, at an upper edge of the lintel, and absorbing forces of the structure of the fuselage upper sub-structure;

a median zone, located between the upper zone and the lower zone, in which the openings are formed, and implementing the transfer of the structural forces between the lower zone and the upper zone.

In accordance with this arrangement, a lintel structure is obtained, which is adapted for the transmission of the forces from and toward the fuselage upper sub-structure and from and to the fuselage bottom sub-structure.

In an aspect, the fuselage bottom sub-structure comprises frames of the fuselage bottom sub-structure, which are limited to said fuselage bottom sub-structure or extend slightly past upper edges of the fuselage bottom sub-structure and fixed to the at least one lintel in the lower zone of the lintel.

In an aspect, the fuselage upper sub-structure comprises frames of fuselage upper sub-structure frames, which are limited to the fuselage upper sub-structure or extend slightly past lower edges of the fuselage upper sub-structure, and fixed to the at least one lintel in the upper zone of the lintel.

According to these aspects, sub-structures of the fuselage upper sub-structure or fuselage bottom sub-structure are obtained, which are arranged in stiffened hulls corresponding to the conventional fuselage structures, without the complexity that would be associated with the presence of windows in these sub-structures, and capable of being fixed to one another, directly or with splice plates, with the interposition of the lintel(s).

In an aspect, the fuselage bottom sub-structure comprises moreover a stress-bearing outer cladding of the fuselage bottom sub-structure, which is fixed to the lintel in the lower zone of the lintel.

In an aspect, the fuselage upper sub-structure comprises moreover a stress-bearing outer cladding of the fuselage upper sub-structure, which is fixed to the lintel in the upper zone of the lintel.

Thus, in the fuselage upper sub-structure and/or fuselage bottom sub-structure, when stress-bearing claddings are used, the forces in the stress-bearing claddings are transferred toward the lintel(s) without increasing the load in the stiffeners.

In an aspect, the aircraft fuselage comprises at least two lintels arranged on the section substantially symmetrical with respect to a longitudinal vertical symmetry plane XZ of the section. In this configuration, each of the edges of the lower fuselage upper sub-structure is fixed to an upper edge of a lintel, and each of the upper edges of fuselage bottom sub-structure is fixed to a lower edge of a lintel.

In this case, a fuselage is obtained, which is substantially symmetric structurally speaking and in which the windows can also be distributed substantially symmetrically.

In an aspect, the openings arranged in a lintel correspond to openings for a row of windows. In this way, a particularly compact lintel of limited height is obtained.

According to alternative aspects, the lintel(s) has(have), in cross section in a plane perpendicular to the longitudinal X axis, a curvature similar to that of the fuselage upper sub-structure and of the fuselage bottom sub-structure in a zone of connection of said fuselage upper sub-structure and of said fuselage bottom sub-structure to said lintels, or it(they) has(have), in cross section along the plane perpendicular to the longitudinal X axis, an outer surface without curvature.

Thus it is possible to ensure continuity of the outer shapes of the fuselage, in particular, when the radii of curvatures of the fuselage upper sub-structure and of the fuselage bottom sub-structure are relatively small in comparison to the height of the lintels, or, on the other handy, to dispense with this continuity, when it is not critical, in order to simplify the implementation of the lintels.

In an aspect of the aircraft fuselage, when the sub-structure of the fuselage bottom sub-structure comprises frames of the fuselage bottom sub-structure, which are limited to the fuselage bottom sub-structure or extend slightly past upper edges of the fuselage bottom sub-structure and fixed to the at least one lintel in the lower zone of the lintel, and which, when the fuselage upper sub-structure comprises frames of the fuselage upper sub-structure, are limited to the fuselage upper sub-structure or extend slightly past lower edges of the fuselage upper sub-structure, which are fixed to the at least one lintel in the upper zone of the lintel, the spacing of the frames of the fuselage bottom sub-structure is, at least locally for some frames, different from the spacing of the frames of the fuselage upper sub-structure.

In this way, the spacing of the frames in the fuselage bottom sub-structure is optimized and independently in the fuselage upper sub-structure.

In an aspect of the aircraft fuselage, when the fuselage bottom sub-structure comprises frames of the fuselage bottom sub-structure, which are limited to the fuselage bottom sub-structure or extend slightly past upper edges of the fuselage bottom sub-structure, and which are fixed to the at least one lintel in the lower zone of the lintel, and, when the fuselage upper sub-structure comprises frames of the fuselage upper sub-structure, which are limited to the fuselage upper sub-structure or extend slightly past lower edges of the fuselage upper sub-structure, and which are fixed to the at least one lintel in the upper zone of the lintel, the spacing of the frames of the fuselage bottom sub-structure and/or of the frames of the fuselage upper sub-structure is, at least locally for some frames, different from a spacing of the window openings.

Thus the spacing of the frames is optimized in the fuselage bottom sub-structure and in the fuselage upper sub-structure, independently of the arrangement of the windows.

When the aircraft fuselage results from an assembly of sections, at least one of the sections comprises features among the features described above for the fuselage, so that the fuselage benefits from the advantages of the disclosed embodiment, even if it is implemented by a section assembly.

The disclosed embodiment also relates to an aircraft comprising a fuselage in accordance with the fuselage described, so that the plane benefits from a simple construction and reduced production and operating costs.

BRIEF DESCRIPTION OF THE DRAWINGS

The description and the drawings of a particular aspect of the disclosed embodiment will make it possible to better understand the aims and advantages of the disclosed embodiment. It is clear that this detailed description is given as an example and has no limiting character.

In the drawings:

FIGS. 4a to 4e illustrates, in a side view from the interior of the structure of the section, different examples of shapes of openings for windows, which are admissible for the implementation of a lintel, only some of the passenger seats being illustrated in outline in FIGS. 4b to 4e, in order to show the advantages contributed to the visual comfort of the passengers.

DETAILED DESCRIPTION

Figure 1:
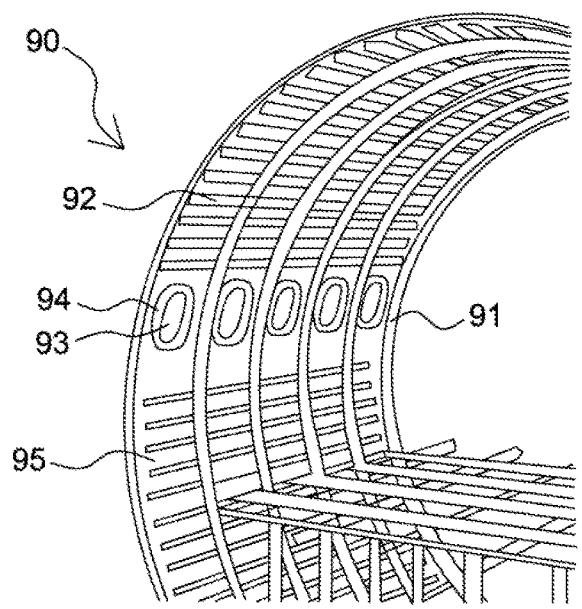
FIG. 1, already cited, illustrates a partial perspective view of an example of an aircraft fuselage structure according to the prior art, in a zone comprising openings for windows, which are arranged above a cabin floor structure.

In the different figures, similar elements ensuring similar functions bear the same reference numeral, including when they are different in terms of their shapes.

As needed, a reference X, Y, Z will be used for longitudinal, transverse and vertical axes of the section. The X axis corresponds to a longitudinal axis oriented positively toward the front, the Z axis has a vertical axis oriented positively toward the top. The Y axis is perpendicular to the XZ plane and forms a trihedron directly with the X and Z axes.

Figure 2:
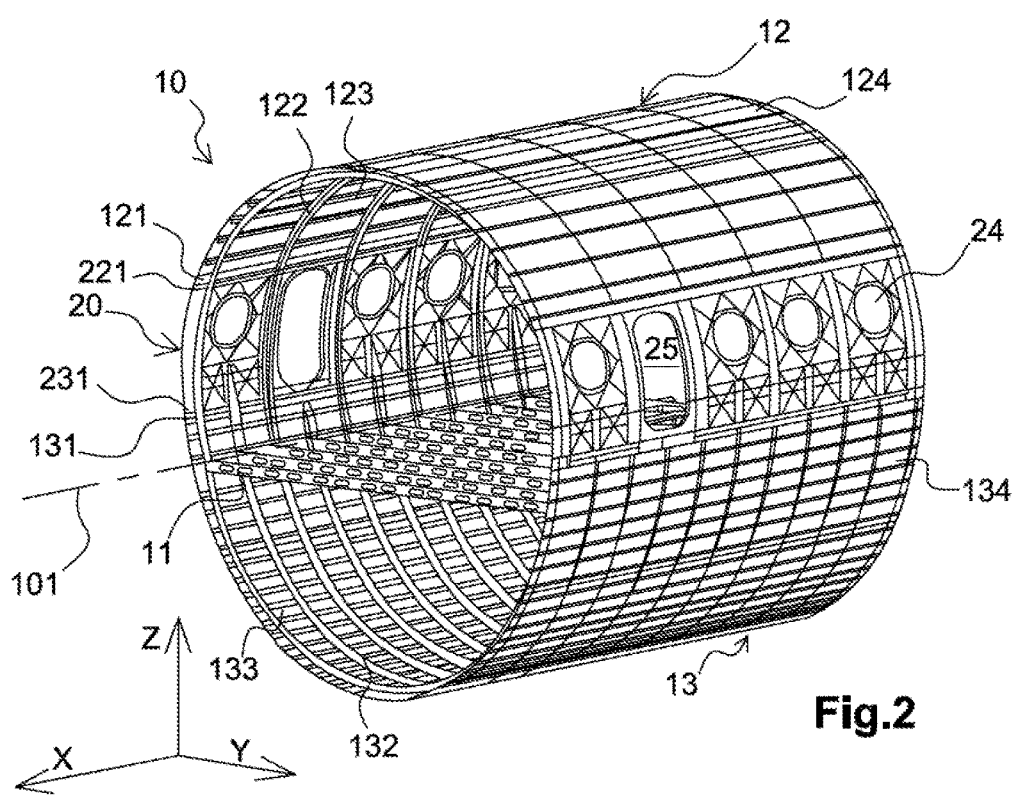
FIG. 2 illustrates, in a perspective view, an example of a structure of an aircraft fuselage section according to the disclosed embodiment, which is substantially cylindrical, in a zone comprising openings for the windows and the emergency exits.

FIG. 2 illustrates, in a perspective view, a structural example according to the disclosed embodiment of an aircraft fuselage section 10, following here an aspect of the aircraft fuselages implemented by an assembly of separately produced sections.

However, the structure, which is described in the context of the disclosed embodiment for a section, applies to a fuselage wherein said fuselage does not necessarily result from an assembly of several sections.

For example, the fuselage can be produced by the assembly of frames, stringers and fuselage panels to form the structure of the fuselage directly.

The section 10 represented is of cylindrical shape and has a circular cross section, but it could also have changing non-cylindrical shapes such as, for example, a fuselage structure in a front part or in a rear part of the fuselage of the aircraft, and it could also have a non-circular cross section.

The section 10 illustrated in FIG. 2 comprises a cabin floor structure 11, but it is represented without any of the non-structural functional elements which are integrated in it in the aircraft.

A longitudinal axis 101 of the fuselage will be considered, the direction of which is substantially that of the generatrixes of the cylindrical parts and which corresponds to the direction of the X axis.

The section 10 comprises fuselage upper sub-structure 12 in an upper part of the fuselage, a fuselage bottom sub-structure 13 in a lower part of the fuselage, and two lintels 20 arranged between said fuselage bottom sub-structure and said fuselage upper sub-structure.

Here, the term lintel designates a part of the structure of the fuselage section, which forms an intermediate structural connection structure between the fuselage upper sub-structure 12 and the fuselage bottom sub-structure 13, and which comprises openings intended for installing windows and/or emergency exits.

The fuselage bottom sub-structure 13 has a curved transverse cross section, which is here substantially in the shape of an arc of a circle and open toward the top of the fuselage. The fuselage bottom sub-structure 13 is assembled by upper edges 131 of the fuselage bottom sub-structure to lower edges 231 of a lintel, a lintel being assembled at each upper edge 131 of the fuselage bottom sub-structure.

The fuselage upper sub-structure 12 also have a curved transverse cross section, which is here substantially in the shape of an arc of a circle and open toward the bottom of the fuselage. The fuselage upper sub-structure 12 are assembled by lower edges 121 of the fuselage upper sub-structure to upper lintel edges 221, a lintel being assembled at each lower edge 121 of the fuselage upper sub-structure. In the example illustrated, the structure of the section 10 thus is the result of an assembly of four main sub-assemblies:

the fuselage upper sub-structure 12 in the upper part;

the fuselage bottom sub-structure 13 in the lower part;

the two lintels 20 in lateral parts forming structural connections between the fuselage upper sub-structure and the fuselage bottom sub-structure at each of the edges of said fuselage upper sub-structure and of said fuselage bottom sub-structure.

In the illustrated exemplary aspect of FIG. 2, the edges of the fuselage upper sub-structure, of the fuselage bottom sub-structure and of the lintels are represented to be straight and substantially parallel to the direction of the longitudinal axis 101 and of the X axis. However, such a configuration is not compulsory, the constraint being that the edges of a lintel coincide during the assembly of the different parts with the edges of the fuselage upper sub-structure and of the fuselage bottom sub-structure, respectively.

It is also not obligatory that the transverse cross section of the fuselage is symmetric with respect to a vertical XZ plane.

Each of fuselage upper sub-structure 12 and fuselage bottom sub-structure 13 comprises a conventional fuselage structure, in particular, an assembly of fuselage upper sub-structure and fuselage bottom sub-structure frames 122, 132, respectively, formed in this case primarily with open frames that correspond only to the part of fuselage part section 10 in question, fuselage upper sub-structure or fuselage bottom sub-structure, with longitudinal stiffeners 123, 133 and with an outer cladding 124, 134 of the fuselage upper sub-structure and fuselage bottom sub-structure, respectively, which is limited to the fuselage part corresponding substantially to the fuselage upper sub-structure or the fuselage bottom sub-structure in question.

In practice, the frames and outer claddings can be extended slightly beyond the upper edges of the fuselage bottom sub-structure or the lower edges of the fuselage upper sub-structure, in such a manner as to obtain a cladding with a part of the structure of the lintels for assembly purposes.

A special feature of the section, which can be seen in FIG. 2, for example, consists in that a spacing of the frames, which is the distance between adjacent frames, is different for the frames 122 of the fuselage upper sub-structure and for the frames 132 of the fuselage bottom sub-structure. This difference in the spacing of the frames is justified by the forces of different intensities that have to be absorbed by the fuselage.

As will be understood better based on the detailed description of the example, it should be noted that the spacing of the frames 122 of the fuselage upper sub-structure is not constrained by the spacing of the frames 132 of the fuselage bottom sub-structure, said frames being interrupted at the lintels, and that the result of this is that the spacings of the frames of the fuselage bottom sub-structure and of the fuselage upper sub-structure can be different, in contrast to the case of conventional fuselage structures such as those illustrated in FIG. 1, in which the frames are closed along a perimeter of the section of the fuselage.

In this aspect example of FIG. 2, the distribution of the frames consists of two frames 132 of the fuselage bottom sub-structure per one frame 122 of the fuselage upper sub-structure.

In the fuselage 10 of the disclosed embodiment, the frames 122 of the fuselage upper sub-structure are not fixed directly to the frames 132 of the fuselage bottom sub-structure, as in a conventional fuselage, instead they are fixed each and independently to the lintels 20.

To make possible this structural architecture of the fuselage section, each lintel is designed in order to absorb, in a lower zone 23 of said lintel on the side of the lower lintel edge 231, the forces of the frames 132 of the fuselage bottom sub-structure and of the outer cladding 134 of the fuselage bottom sub-structure, in order to absorb, in an upper zone 22 on the side of the upper lintel edge 221, the forces of the frames 122 of the fuselage upper sub-structure and of the outer cladding 124 of the fuselage upper sub-structure, and, for this purpose, lead the forces between the upper lintel zone 221 and the lower lintel zone 231.

The structural connection of the frames and of the outer claddings, which a priori are stress-bearing, to the lintels can be formed according to any known assembly method that meets the desired quality and resistance requirements. For example, it is used for the assembly of connected fixations and/or bondings directly between the assembled structure or via splice plates.

The structure of the lintel 20 can thus be designed and produced as a function of only the conditions at the limits of the lower lintel edge 231 and the upper lintel edge 221, in such a manner that the forces flow in an optimal manner in said lintel structure, taking into consideration the openings of the windows and, if applicable, of exits.

Today, the optimization of the structure of a part as a function of the loading conditions at the limits is routine practice for the person skilled in the art in the field of the calculations of the structures, for example, by the application of finite element calculations.

An advantage of the fuselage section structure 10 of the disclosed embodiment is the possibility of producing lintels 20 by using different technologies from those of the fuselage bottom sub-structure 13 and/or of the fuselage upper sub-structure 12.

For example, the lintels 20 can be obtained by integral machining of thick metal plates, for example, planar metal plates bent or not to the desired curvature before or after machining. In this case it is possible to obtain complex shapes while limiting the volume of structural parts to be machined.

For example, the lintels 20 can be made of a composite material by molding and/or shaping of composite materials having matrices formed with thermohardenable or thermoplastic resins.

To produce a fuselage section 10 according to the disclosed embodiment, the section is precut, in a study phase, to form fuselage bottom sub-structure 13, fuselage upper sub-structure 12, and at least one lintel 20, the assembly of which forms the structural part of the section 10, and in such a manner that the at least one lintel comprises openings intended for receiving windows and/or emergency exits, and in the form of an intermediate connection structure between the structure of the fuselage upper sub-structure and the structure of the fuselage bottom sub-structure.

The structure of fuselage bottom sub-structure 13, frames 132 of the fuselage bottom sub-structure, stiffeners 133 of the longitudinal fuselage bottom sub-structure, and outer cladding 134 of the fuselage bottom sub-structure is studied and defined so as to separately optimize said structure of said fuselage bottom sub-structure, in particular the cross sections and the spacing of the frames, as well as the outer cladding thicknesses, for example, in order to optimize the mass, taking into account cases of loading of the structure of the fuselage bottom sub-structure as sub-structure of the section.

In the same way, the structure of fuselage upper sub-structure 12, frames 122 of the fuselage upper sub-structure, longitudinal stiffeners 123 and outer cladding 124 of the fuselage upper sub-structure is studied and defined in such a manner as to separately optimize said structure of said fuselage upper sub-structure, in a manner similar to the structure of the fuselage bottom sub-structure, taking into account cases of loading of the structure of the fuselage upper sub-structure as sub-structure of the section.

Finally, the structure of the at least one lintel is studied and calculated in order to ensure the transfer of the forces between the fuselage upper sub-structure and the fuselage bottom sub-structure and to incorporate reinforcements taking into consideration the openings in the structure.

The spacing of the frames, both that of the fuselage bottom sub-structure and that of the fuselage upper sub-structure, can thus be considered independently for the fuselage bottom sub-structure part and the fuselage upper sub-structure part of the section, and independently of the arrangement of the windows and emergency exits which are located in the lintels.

The result is that the spacing of the frames is adapted and optimized as a function of dimensioning constraints specific to each sub-structure and is in practice different, at least in some zones of the section, for the fuselage bottom sub-structure and for the fuselage upper sub-structure. If applicable, it can be adapted in the same sub-structure, so that the spacing of the frames varies, a case that is not illustrated, as a function of the position along the longitudinal axis on the sub-structure in question, in order to take into consideration structural constraints, which generally vary along a length of the sub-structure in question.

This situation is taken into consideration particularly advantageously in the fuselage of the disclosed embodiment, given that the spacing of the windows is usually constant.

The sub-structures of the structure of the section 10, fuselage upper sub-structure, fuselage bottom sub-structure and lintels thus defined are then produced separately by the implementation of fabrication techniques adapted for each one of the sub-structures.

For example, the fuselage upper sub-structure 12 and the fuselage bottom sub-structure 13 are produced by an assembly of frames and longitudinal stiffeners forming a lattice structure to which the cladding is connected.

For example, the lintel(s) is(are) produced integrally by machining or by assembly of machined elements and/or of parts made of composite material.

Figure 3A:
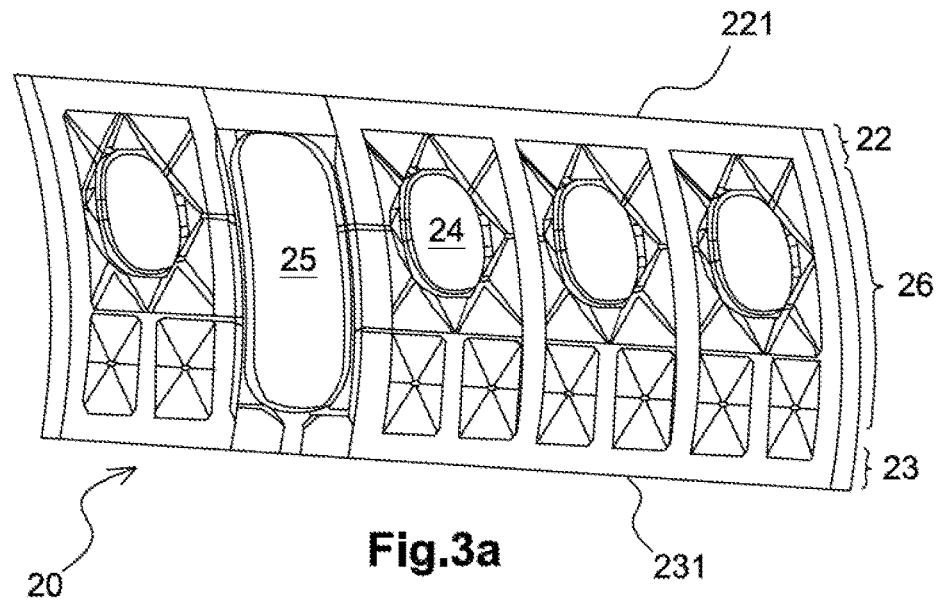
FIG. 3a illustrates, in a perspective view, an inner surface of the isolated lintel presented, assembled in the structure of the section of FIG. 2.

FIG. 3*a* illustrates a separate lintel example 20 of the example of the fuselage section 10 illustrated in FIG. 2.

The upper lintel edge 221 and lower lintel edge 232 are substantially straight and determine a longitudinal direction of the lintel, which is substantially parallel to the longitudinal direction 101 of the fuselage, when said lintel is integrated in a fuselage section.

The lintel 30 also comprises window openings 24 located at the desired locations for the windows and, in the example illustrated, it also comprises a door opening 25 for an emergency exit, which corresponds to a door of reduced height, but which, in the example illustrated, determines a height of the lintel.

FIG. 3*a* illustrates, along the height of the lintel
the lower zone 23;
the upper zone 22;
a median zone 26 located between the said upper zone and said lower zone.

The median zone 26 corresponds to a part of the lintel 20 in which the window openings 24 are formed and which is separated from the upper lintel edge 221 by the upper zone 22 and separated from the lower lintel edge 231 by the lower zone 23.

According to a characteristic structure of the upper zone 22, structural reinforcements of said upper zone are arranged in order to absorb concentrated loads and/or loads distributed at known locations of the upper lintel edge 221 and transmit said loads in the median lintel zone 26.

Similarly, according to a characteristic structure of the lower zone 23, structural reinforcements of said lower zone are arranged to absorb concentrated loads and/or loads distributed at known locations of the lower lintel edge 231 and transmit said loads in the median lintel zone 26.

The median zone 26 comprises the window opening 24 and the door opening 25, structural elements of said median zone being arranged in order to ensure the flow of the forces around said openings, and the continuity of the flows of forces between the lower zone 23 and the upper zone 22.

In lintel example 20 illustrated in FIG. 3*a*, the presence of a door opening 25 integrated in said lintel, having a height greater than the heights of the window openings 24, determines a height of the median zone 26 of said lintel and thus a total height of said lintel.

Figure 3B:
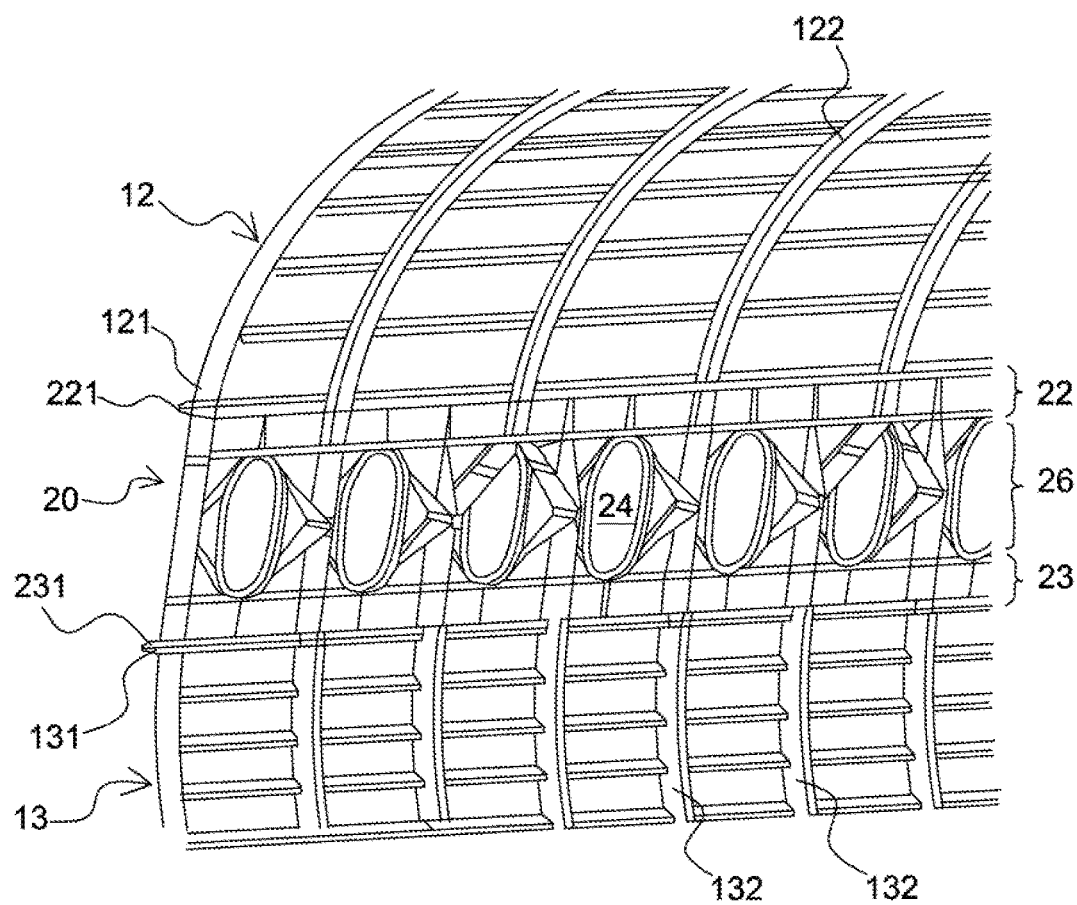
FIG. 3b illustrates, in a partial perspective view, another example of a lintel, presented integrated in a fuselage section structure, in a zone that comprises only openings for windows, the lintel having no curvature in the plane of the transverse cross section of the section.

The lintel 20 illustrated in FIG. 3*b* shows a lintel example comprising only window openings 24. The result is a lintel having a reduced total height in comparison to the case illustrated in FIG. 3*a*, and the lintel is thus less complex and less expensive to produce.

In addition, in this aspect example, an outer surface of the lintel 20 has no curvature in the transverse YZ plane and does not follow the overall curvature of the transverse sections of the fuselage.

This shape is possible without appreciable penalty in terms of structure, because of the possibility of adapting the structure so as to confer the needed rigidity to the lintel.

This shape not only allows a simpler implementation of the lintel, but also an improvement of cabin comfort by moving away the cabin width decrease due to the curvature of the frames toward the top of the cabin.

In this aspect, any door openings 25 are preferably provided by means of specific structures that are separate from the lintel structures integrating window openings.

FIG. 3*b* also illustrates an aspect example of a section 10 in which the frames 122 of the fuselage upper sub-structure and the frames 132 of the fuselage bottom sub-structure are distributed with different spacings and differently from the example illustrated in FIG. 2. In this aspect example, the distribution of the frames consists of three frames 132 of the fuselage bottom sub-structure per two frames 122 of the fuselage upper sub-structure.

It should be noted that, in the examples illustrated in FIGS. 2, 3*a* and 3*b*, the spacing of the windows is constant, and the shape of the windows is unique, but that, in an aspect which is not illustrated, it is possible, by means of the disclosed embodiment, and due to the absence of a necessary correlation between the positions of the frames and the positions of the windows, to produce a fuselage comprising windows arranged with different spacings and/or having different shapes or dimensions. Such an option makes it possible, for example, to implement spacings or dimensions or shapes of windows that are different for different zones of the fuselage, corresponding, for example, to cabins of various levels of luxury.

FIGS. 4*a*, 4*b*, 4*c*, 4*d* and 4*e* show examples of lintel structures incorporating window openings of various shapes, said openings being illustrated with positions of passenger seats 30.

In FIGS. 4*a* to 4*e*, the seats are represented only in a simplified manner in order to illustrate the position of passengers in the seated position.

The possibility of producing openings having different opening dimensions for the windows, if there is a larger number of them, in terms of width and/or height, and the possibility of positioning said openings as a function of the probable positions of the seats, provide increased comfort for the passengers by giving them an improved view of the outside world of the aircraft.

FIG. 4*a* illustrates an example of window openings of relatively small dimensions and conventional shapes, which gives the possibility of arranging two windows at each one of the seats, giving the passenger a wider view of the outside in spite of the reduced dimensions of the windows. This aspect also leads to near continuity between the windows along the fuselage, which makes it possible to modify the spacing of the seats in a cabin arrangement, while ensuring that no passenger is in a "blind" zone.

FIG. 4*b* illustrates a case of openings for placing windows having a rhombus shape with an extension along the longitudinal direction, which gives the passenger at the window a relatively panoramic view unknown with conventional windows, both horizontally and vertically.

Figure 4C:
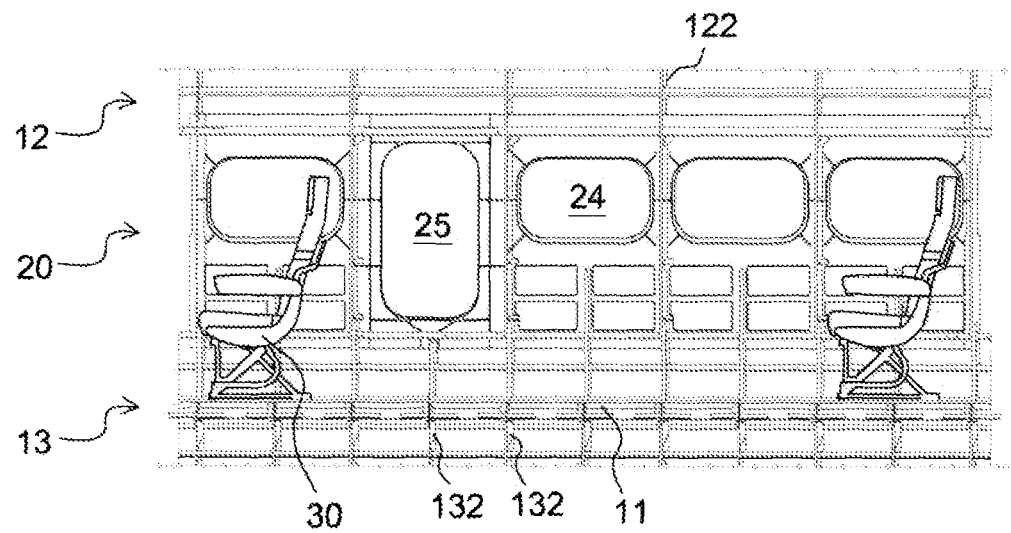

FIG. 4*c* illustrates a case of openings for placing rectangular windows with the long side oriented along the longitudinal axis. Such an arrangement presents the advantages of a panoramic view, at least horizontally.

Figure 4D:
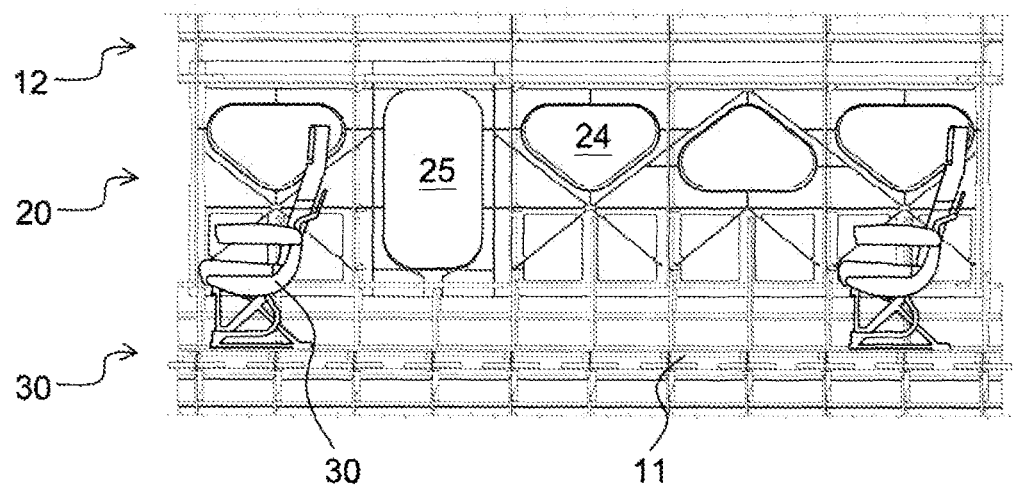

FIG. 4*d* illustrates another shape for placing triangular windows. In this example, the direction of the windows alternates so as to offer near continuity of the opening in the fuselage, while at the same time allowing inclined structural reinforcements passing between the openings.

Figure 4E:
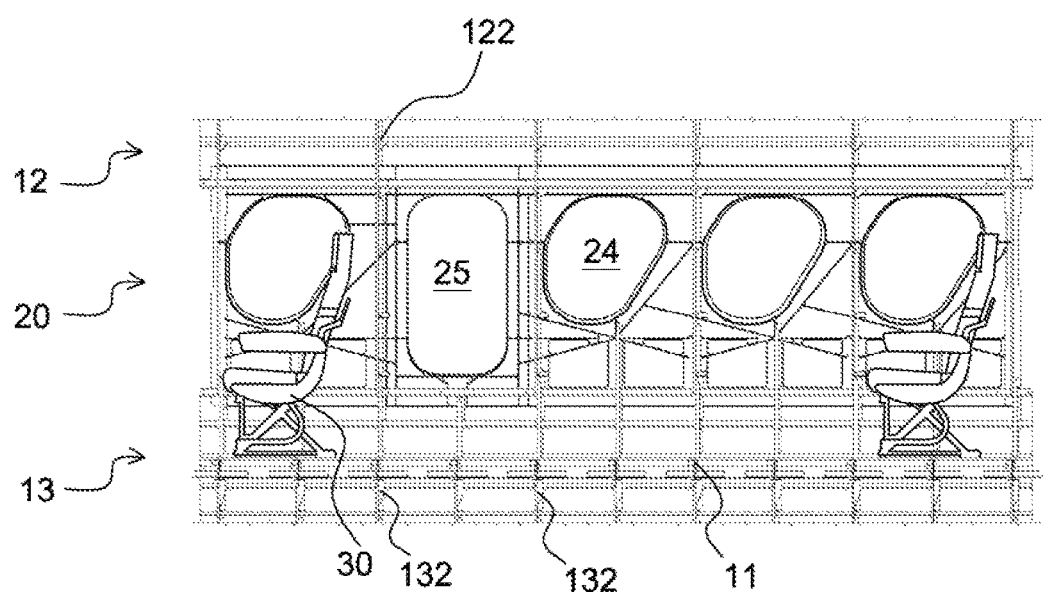

FIG. 4e illustrates a shape of irregular openings which enables the installation of windows of large dimensions suitable for covering a broad field of vision for a passenger seated close to such a window.

In the different aspects, the lintels 20 are produced in the form of stiffened structures, the stiffeners or ribs of which are dimensioned and oriented so as to transfer the loads between the upper zones 22 and lower zones 23 of the lintels, taking design precautions in order to avoid an excessive level of stresses, in particular close to the openings.

The solutions described can have variants without going beyond the presently disclosed embodiment.

Thus, the shapes and the dimensions of the different elements constituting the structure of the fuselage can be different from those given as an example.

In particular, although described in the case of a substantially cylindrical fuselage section, which is intended to be integrated in a fuselage, the principles on which the disclosed embodiment is based can be applied to non-cylindrical fuselage sections and they can also be applied to a fuselage structure without the need to produce the structure by section assembly.

In particular, the shapes of the openings of windows or of exits, as well as the arrangements and distributions of the frames can be different from the shapes illustrated.

In a shape which is not illustrated, a fuselage can be provided on one side or on both sides thereof with two or more lintels, for example, in order to incorporate rows of superposed windows of a fuselage with several decks.

The disclosed embodiment thus makes it possible to obtain an aircraft fuselage, the structure of which is simplified by a specialization of the parts of the fuselage, which frees the designer from constraints specific to each of the parts.

The result is a lighter structure and broader design possibilities, in particular for the implementation of the openings of windows in the walls of the fuselage.

What is claimed is:

1. An aircraft fuselage having a structure, considered in respect of all or part of the fuselage, comprising:
    a fuselage upper sub-structure constituting an upper part of said fuselage, the fuselage upper sub-structure including upper fuselage sub-structure frames arranged so as to be spaced apart from one another a predetermined distance;
    a fuselage bottom sub-structure constituting a lower part of said fuselage, the fuselage bottom sub-structure including bottom fuselage sub-structure frames arranged so as to be spaced apart from one another a different predetermined distance different than the predetermined distance of the upper fuselage sub-structure frames; and
    openings intended for the installation of windows or exit doors of the fuselage;
    wherein the fuselage upper sub-structure and the fuselage bottom sub-structure form sub-structures of the fuselage, which are assembled to one another via at least one lintel in which all or some of the openings intended for installing the windows or exit doors are formed, the at least one lintel forming an intermediate structural connection structure between the fuselage upper sub-structure and the fuselage bottom sub-structure.

2. The aircraft fuselage according to claim 1, wherein the at least one lintel comprises:
    a lower zone, to which the fuselage bottom sub-structure is fixed by an upper edge of the fuselage bottom sub-structure, at a lower lintel edge, and absorbing forces of the structure of said fuselage bottom sub-structure;
    an upper zone, to which the fuselage upper sub-structure are fixed by a lower edge of the fuselage upper sub-structure, at an upper edge of the lintel, and absorbing forces of the structure of said fuselage upper sub-structure; and
    a median zone, located between the upper zone and the lower zone, in which the openings are formed, and implementing the transfer of the structural forces between the lower zone and the upper zone.

3. The aircraft fuselage according to claim 1, further comprising at least two lintels arranged on a section substantially symmetrical with respect to a longitudinal vertical symmetry plane XZ of the section, and in which each of the lower edges of the fuselage upper sub-structure is fixed to an upper edge of a lintel, and in which each of the upper edges of the fuselage bottom sub-structure is fixed to a lower edge of a lintel.

4. The aircraft fuselage according to claim 1, wherein the openings arranged in a lintel correspond to openings for a row of windows.

5. The aircraft fuselage according to claim 1, wherein the at least one lintel has, in cross section in a plane perpendicular to the longitudinal X axis, a curve that is similar to that of the fuselage upper sub-structure and of the fuselage bottom sub-structure, in a zone of connection of said fuselage upper sub-structure and of said fuselage bottom sub-structure to said lintels.

6. The aircraft fuselage according to claim 1, wherein the at least one lintel(s) has, in cross section along a plane perpendicular to the longitudinal X axis, an outer surface without curvature.

7. The aircraft fuselage according to claim 1, wherein the bottom fuselage sub-structure frames of the fuselage bottom sub-structure, which are limited to said fuselage bottom sub-structure or extend slightly past upper edges of the fuselage bottom sub-structure and which are fixed to the at least one lintel in the lower zone of said lintel, and/or in which the upper fuselage sub-structure frames of the fuselage upper sub-structure, which are limited to said fuselage upper sub-structure or extend slightly past lower edges of the fuselage upper sub-structure and which are fixed to the at least one lintel in the upper zone of said lintel, the spacing of said bottom fuselage sub-structure frames of the fuselage bottom sub-structure and/or of said upper fuselage sub-structure frames of the fuselage upper sub-structure being, at least locally for some frames, different from a spacing of the window openings.

8. The aircraft fuselage according to claim 1, wherein the bottom fuselage sub-structure frames of the fuselage bottom sub-structure, which are limited to said fuselage bottom sub-structure or extend slightly past upper edges of the fuselage bottom sub-structure, and are fixed to the at least one lintel in the lower zone of said lintel, and/or in which upper fuselage sub-structure frames of the fuselage upper sub-structure, which are limited to said fuselage upper sub-structure or extend slightly past lower edges of the fuselage upper sub-structure and are fixed to the at least one lintel in the upper zone of said lintel.

9. The aircraft fuselage according to claim 8, wherein the fuselage bottom sub-structure comprises moreover a stress-bearing outer cladding of the fuselage bottom sub-structure, which is fixed to the lintel in the lower zone of said lintel, and/or in which the fuselage upper sub-structure comprises moreover a stress-bearing outer cladding of the fuselage upper sub-structure, which is fixed to the lintel in the upper zone of said lintel.

10. An aircraft fuselage resulting from an assembly of sections, wherein at least one section comprises the features of a fuselage according to claim 1.

11. An aircraft comprising a fuselage in accordance with the fuselage according to claim 1.

\* \* \* \* \*